INVENTORS
AKIRA ABE
KENJI KONISHI

BY Reynolds & Christensen

ATTORNEYS

Fig. 11.

Aug. 30, 1966     AKIRA ABE ETAL     3,269,505
CONTROL SYSTEM FOR VENDING MACHINES
Filed July 16, 1964     10 Sheets-Sheet 10

*Fig. 12.*

NOT ELEMENT

OR ELEMENT

MEMORY ELEMENT

AND ELEMENT

INHIBIT ELEMENT

DELAY ELEMENT

BINARY COUNTER

INVENTORS
AKIRA ABE
KENJI KONISHI
BY Reynolds & Christensen
ATTORNEYS

United States Patent Office 3,269,505
Patented August 30, 1966

3,269,505
CONTROL SYSTEM FOR VENDING MACHINES
Akira Abe, Kyoto, and Kenji Konishi, Osaka, Japan, assignors to Tateisi Electronics Co., Kyoto, Japan, a corporation of Japan
Filed July 16, 1964, Ser. No. 383,563
Claims priority, application Japan, July 17, 1963, 38/38,667
11 Claims. (Cl. 194—10)

This invention relates to a control system for vending machines and, particularly, to a control system for vending machines employing static components.

In prior art vending machine control systems, relatively movable parts such as magnetic relays, mechanical switches, levers and other mechanical elements have been employed. Each of these parts involves a maintenance and performance problem.

In accordance with the invention, the control system is constructed substantially of static components. In a preferred embodiment of this invention the control system is composed of logic elements each having two stable states. As examples of preferred logic elements, reference is to be made to NOT, OR, MEMORY, AND, INHIBIT and DELAY element. In addition, pulse counters and digital indicator tubes are employed.

The NOT element produces an output only while no input is supplied to its terminal.

The OR element produces an output when one or more control inputs are applied.

The MEMORY element, also referred to as a "flip-flop," produces in response to a first input condition an output which is maintained even though the first condition thereafter is discontinued, and is reset and the output terminates in response to a second input condition.

The AND element produces an output when two or more control inputs are applied at the same time.

The INHIBIT element is such that so long as the inhibit terminal is energized the element produces no output even when an input is applied thereto, while upon deenergization of the input terminal the element produces an output when an input is applied thereto.

The DELAY element interposes a delay between the application thereto of an input signal and the production thereby of an output.

The pulse counter which may consist of binary counters, is such that when an input pulse is applied, an output is produced at one output terminal and continues only until the next input pulse is applied, when an output appears at the other output terminal.

The digital indicator tube indicates the numeral corresponding to the number of pulses received thereby.

It is an object of the invention to provide a vending machine control system having an improved control system.

Another object of the invention is to provide an improved vending machine control system constructed substantially of static logic elements.

A further object of the invention is to provide an improved vending machine control system having a pulse generator and also pulse counters for counting the number of pulses corresponding to the price of the article or articles selected by the purchaser.

Still another object of the invention is to provide an improved vending machine control system having an indicator capable of indicating the price of the article or the total price of the articles selected by the purchaser.

Still another object of the invention is to provide an improved vending machine control system which makes it possible for the purchaser to select a plurality of articles and get all of them at once.

Still another object of the invention is to provide an improved vending machine control system having a pulse generator and pulse counters for counting the number of pulses corresponding to the denomination of the coin or the total denomination of the coins introduced.

Another object of the invention is to provide an improved vending machine control system having means for summing up the denominations of the coins introduced and indicating the total.

Another object of the invention is to provide an improved vending machine control system having means for returning change to the purchaser when the article or articles selected by him have been overpaid.

Another object of the invention is to provide an improved vending machine control system having means for indicating the change to be returned to the purchaser.

Another object of the invention is to provide an improved vending machine control system having means for returning change which may be coins of the same or different denominations.

Still another object of the invention is to provide an improved vending machine control system having means for preventing insertion of any more coins when the aggregate sum of the coins that have been introduced has amounted to the total price of the articles to be purchased.

Still another object of the invention is to provide an improved vending machine control system having means for returning to the purchaser all the coins already introduced any time he wishes to refrain from purchasing.

Other objects of the invention will be apparent from the following detailed description of preferred embodiment of the invention with reference to the accompanying drawings wherein.

The system of the invention is provided with a plurality of push button switches corresponding respectively to articles of different kinds and/or prices and so adapted to be operated by the purchaser when he wishes to buy an article or articles of different kinds and/or prices. Preferably, each switch is provided with means for indicating the price of the article it corresponds to when the switch is operated. After pushing one or more of the push button switches, the purchaser drops coins into a coin inlet or inlets provided on the machine for the purpose. If a plurality of coins are dropped, the system counts the number of pulses corresponding to the sum of their denominations and indicates the result. If the total denomination of the coins that have been introduced amounts to the price of the article or the total price of the articles to be purchased, the article or articles are delivered. At the same time the coin inlet or inlets are shut to prevent further insertion of coins. If the last coin that has been introduced has resulted in overpayment, the excess amount will be returned. Even when the purchaser has deposited a coin or coins, he may refrain from buying the article delivery mechanism has started its operation, and have the coin or coins already introduced paid back.

The illustrated embodiment of the invention is so constructed and arranged that seven different kinds of articles priced at 40, 50, 60, 70, 80 and 90 cents and 1 dollar are sold, and that 10-cent, 50-cent and one dollar coins are acceptable. Of course, the number of articles to be sold and the types of coins to be used are variable, and the circuit arrangements may accordingly be changed.

Figure 1:
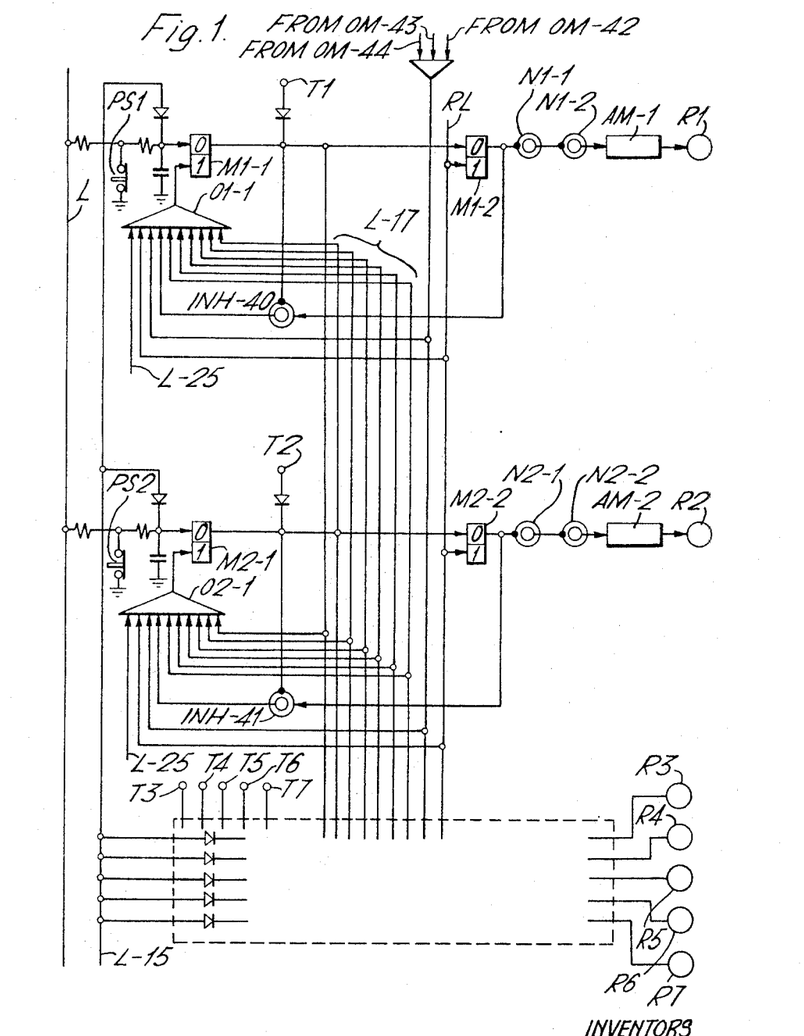
FIGS. 1 through 6 are schematic diagrams separately illustrating the various circuits of the system of the invention embodying the static elements.

As many push buttons as there are different kinds of goods on sale are provided, two of which are shown by way of example in FIG. 1. The push button PS–1 corresponds to 40 cents and PS–2 to 50 cents. The other push buttons are supposed to be included in a broken-line rectangle given at the lower side of the drawing.

When the push button PS–1 is pressed, a relay R1 is energized in the following manner: So long as no set signal is applied to the MEMORY element M1–1, no output is produced. The push button PS–1 is inserted between ground and a —12-volt line L. Therefore, so long as the push button is closed, no input signal is applied to MEMORY element M1–1. When the push button is pressed, a signal is applied to the set terminal of the MEMORY element M1–1, whereupon the element produces a signal at its output terminal. This output signal is applied to the set terminal of a MEMORY element M1–2, the output signal of which is applied to a relay R1 through two NOT elements N1–1 and N1–2 and an amplifier AM–1. It will be easily seen that when the purchaser wishes to buy any other kinds of articles, he may press the corresponding push buttons, the circuit associated with which are quite the same in arrangement and operation as with the above described circuit. Even when the push button PS–1 is released, the MEMORY element M1–1 continues to produce an output until a signal is applied to its reset terminal. As will be described later, when the push button is pressed, a predetermined number of pulses corresponding to the price of articles the push button corresponds to are produced. A signal produced upon completion of the counting of the number of the pulses is applied through a line L–25 to an OR element O1–1, the output of which is applied to the reset terminal of the element M1–1 to stop its output. This results in removal of the signal at the inhibit terminal of the INHIBIT element INH–40. Due to the absence of any inhibit signal at the element, the signal from the element M1–2 causes the element INH–40 to produce an output, which is applied through the OR element O1–1 to the MEMORY element M1–1 to maintain this element in a reset condition. Therefore, even when the push button PS–1 is again pressed, no output is produced by the element M1–1.

The output of the MEMORY element M1–1 is also applied through a terminal T1 to the input terminal T1–1 of an OR element O–10 (FIG. 2), and the output of the element M2–1 is also applied through a terminal T2 to another input terminal T2–1 of the OR element O–10, and in this manner the outputs of the other five MEMORY elements M3–1 through M7–1 are applied through their respective terminals T3 through T7 to the other five input terminals of the OR element O–10, respectively. When any one of the push buttons is pressed, the OR element O–10 is energized to produce an output, which is applied to an OR element O–11. The output of this OR element is applied to a NOT element N–10, whereby no output from the element N–10 is applied through an OR element O–12 to a NOT element N–11. This causes the element N–11 to produce an output, which is applied to one of the two input terminals of an AND element A–10. Applied to the other input terminal of the element A–10 are successive pulses from a pulse generator PG such as an astable multivibrator. Consequently, the AND element A–10 produces an output, which is applied to the set terminal of a MEMORY element M–10 to produce an output at the output terminal of the element. This output is then applied to a NOT element N–12, from which no output is applied to one of the two input terminals of an OR element O–13 so long as the NOT element N–12 is energized by the element M–10. The pulse generator PG is always applying pulses to the other input terminal of the OR element O–13, so that so long as the NOT element N–12 supplies no signal to the OR element O–13, the output of this OR element corresponds to the pulses received from the pulse generator PG. This output is applied to a NOT element N–13, the output pulses of which are reversed. These output pulses are applied through a line L–10 to the set terminal of the MEMORY element M–11 the reset terminal of which has the output of the element N–10 applied thereto. Upon energization of the set terminal of the MEMORY element M–11, the element produces an output, which is applied to the OR element O–12. This results in absence of any output of the NOT element N–11, and, consequently, no input is applied to the AND element A–10. Thus, once the NOT element N–13 produces an output, even if a signal is continuously applied to the OR element O–10 by pressing the push button, say PS–1, continuously, no output is produced by the AND element A–10.

Figure 2:
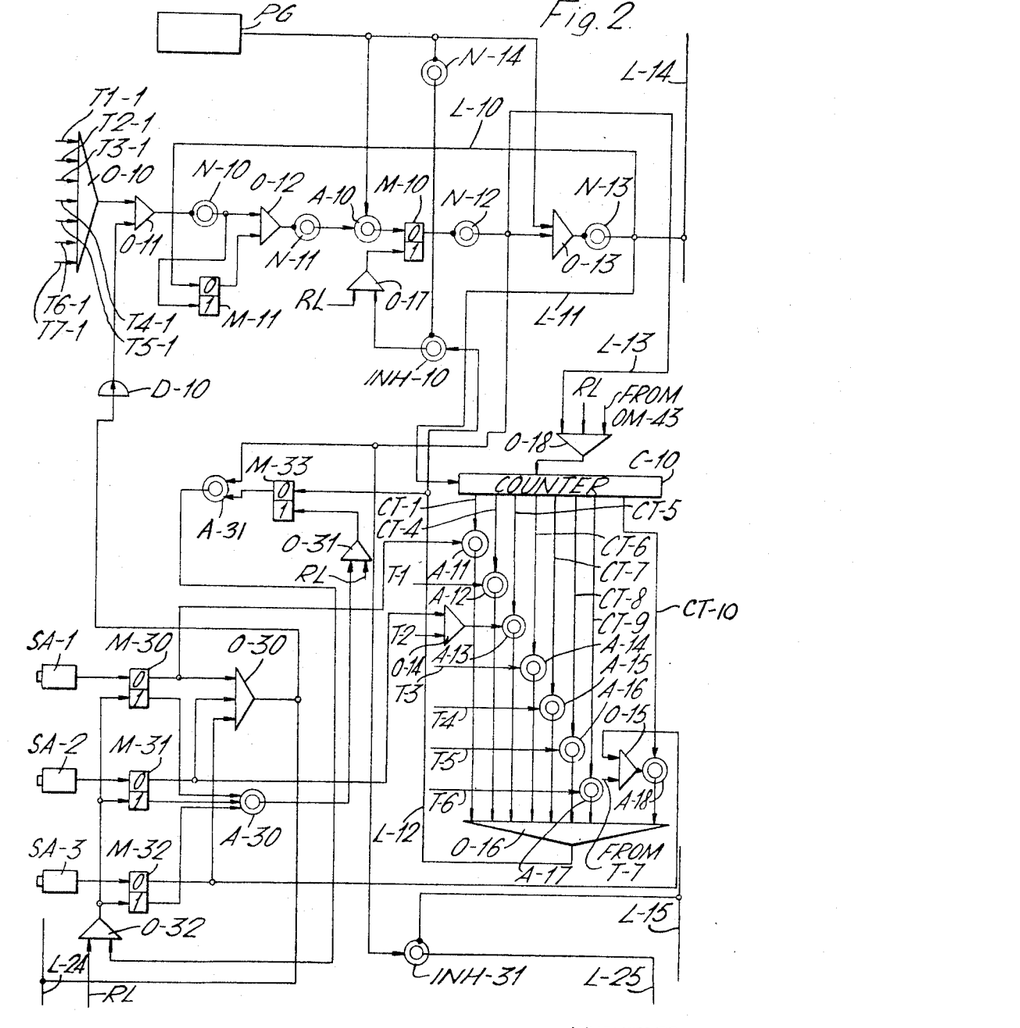

The output pulses of the NOT element N–13 are also applied through a line L–11 to a counter C–10, where the number of the pulses is to be counted. This counter is provided with a plurality of output terminals CT–1, and CT–4 through CT–10. When one, four, five, six, seven, eight, nine and ten pulses have been counted, an output appears at the corresponding terminals CT–1, CT–4 through CT–10, respectively. The terminals CT–1, CT–4 through CT–10 are connected to AND elements A–11 through A–18, respectively. The other input terminal of the AND element A–12 is connected to the terminal T1 (see FIG. 1). The other input terminal of the AND element A–13 is connected to the output terminal of an OR element O–14, one of the two input terminals of which is connected to the terminal T2 (see FIG. 1). To the other input terminal of each of the elements A–14 through A–17 is connected each of the terminals T3 through T6. The AND element A–18 has one of its two input terminals connected to the output terminal of an OR element O–15, which in turn has one of its two input terminals connected to the terminal T7. The output terminal CT–10 of the counter C–10 is connected to the other input terminal of the AND element A–18. The output terminals of all these AND elements A–11 through A–18 are connected to the input of an OR element O–16.

When a push button, say PS–1, is pressed, pulses are applied to the input terminal of the counter C–10 as previously stated and, it begins to count the number of pulses as they are coming in. When four pulses have been counted, an output appears at the terminal CT–4 to be applied to the AND element A–12. Since a signal from the terminal T1 is also applied to the element A–12, it produces an output to be applied to the OR element O–16. When the push button PS–2, which may correspond to 50-cent articles, is pressed, five pulses have to be counted to energize the OR element O–16. In other words, when the same number of pulses as the price divided by ten of the article selected have been counted, an input is supplied to the OR element O–16. The output of the OR element O–16 is applied through a line L–12 to an INHIBIT element INH–10, whose inhibit terminal is connected through a NOT element N–14 to the pulse generator PG. When the output pulses of the NOT element N–14 are not applied to the inhibit terminal of the element INH–10, it produces an output to be applied to an OR element O–17. The output of the OR element O–17 is applied to the reset terminal of the MEMORY element M–10, so that this MEMORY element is reset and has no output any longer. This results in removal of the input of the NOT element N–12 and production thereby of an output. This output is applied through a line L-13 and an OR element O-18 to the reset terminal of the counter C-10 to restore it to the original condition. As many different push buttons as desired may be pressed. In this case, every time a different push button is pressed, a number of pulses corresponding to the price of article the button corresponds to are produced, to be applied through the line L-14 to the counter RC (FIG. 3), and the number of the pulses is added to the number that has been counted.

Figure 5:
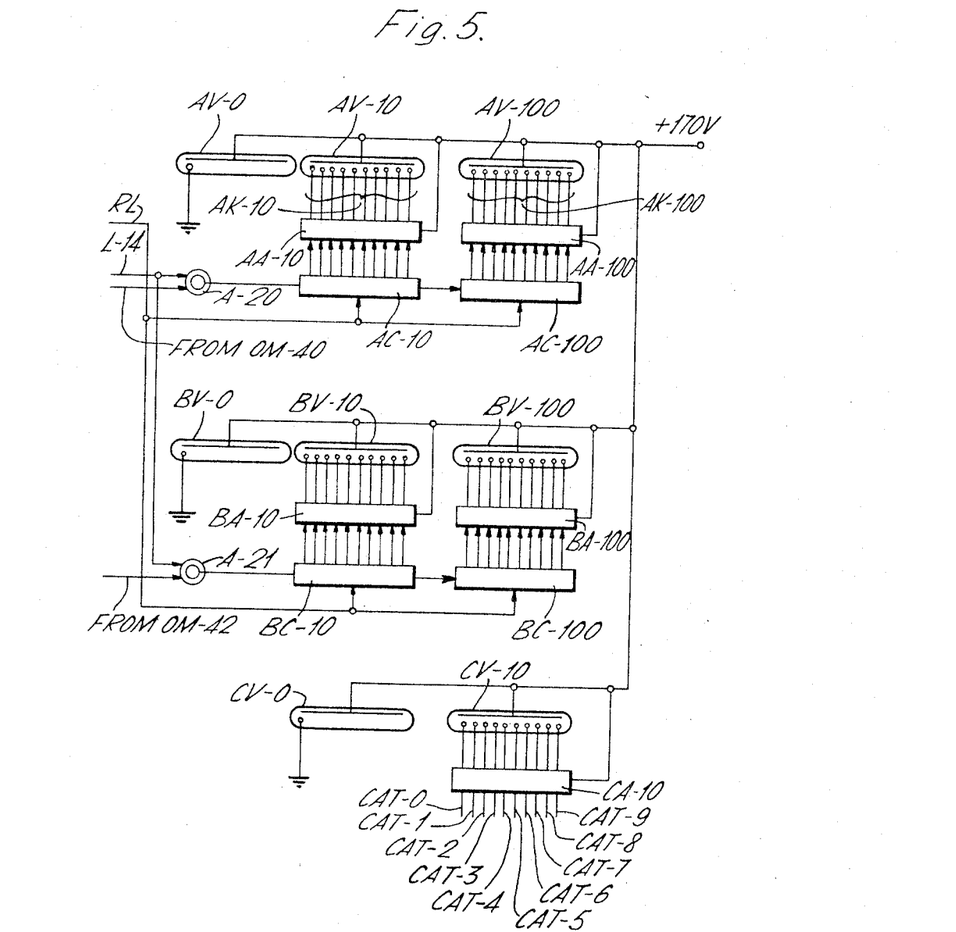

The pulses applied through the line L-14 are used for indicating the price of an article or the total price of articles of different kinds to be purchased. This indication is made in numerals. Referring to FIG. 5, three indicator tubes AV-0, AV-10 and AV-100 are provided. These three tubes cooperate to indicate numbers of three figures. The tube AV-0 always indicates zero regardless of the number of pulses received. The other tubes AV-10 and AV-100 normally indicate zero, but they are capable of expressing numerals 1 through 9. The tube AV-10 is provided with ten cathodes AK-10, which are connected through an amplifier AA-10 to the ten output terminals of a counter AC-10, while the tube AV-100 is provided with ten cathodes AK-100, which are connected through an amplifier AA-100 to the ten corresponding output terminals of a counter AC-100. The counter AC-100 has its input connected to the output of the counter AC-10, at which a signal appears when the latter counter has counted the number of ten. The input of the counter AC-10 is connected to the output of an AND element A-20, one of the two input terminals of which is connected to the line L-14 (FIG. 2). With the other terminal of the AND element A-20 being supplied with a signal which is produced upon pressing of one of the push buttons PS-1 through PS-7 as will be described later, if four pulses appear on the line L-14 to be applied to the counter AC-10, the number is counted by the counter. The output of the counter is amplified by the amplifier A-10 and the numeral "4" appears on the tube AV-10. Thereafter, if seven pulses are applied through the line L-14, these seven pulses are added to the four pulses previously counted, so that the indication on the tube AV-10 will be changed to the numeral "1," and the counter AC-10 applies one pulse to the input of the counter AC-100 thereby to make the tube AV-100 indicate the numeral "1." Thus, the three numerals on the tubes AV-100, AV-10 and AV-0 express the numeral "110," if the tubes are arranged from left to right in the order given here on the front panel of the machine. And if the word "cents" is given at the right side of the tube AV-0, the numeral may indicate the total price as "110 cents."

From the foregoing description, it will be understood that when the purchaser presses one or more push buttons corresponding to the prices of the kinds of articles that have been selected, the total price thereof is counted and registered by the counters as a corresponding number of pulses and indicated.

Figure 3:
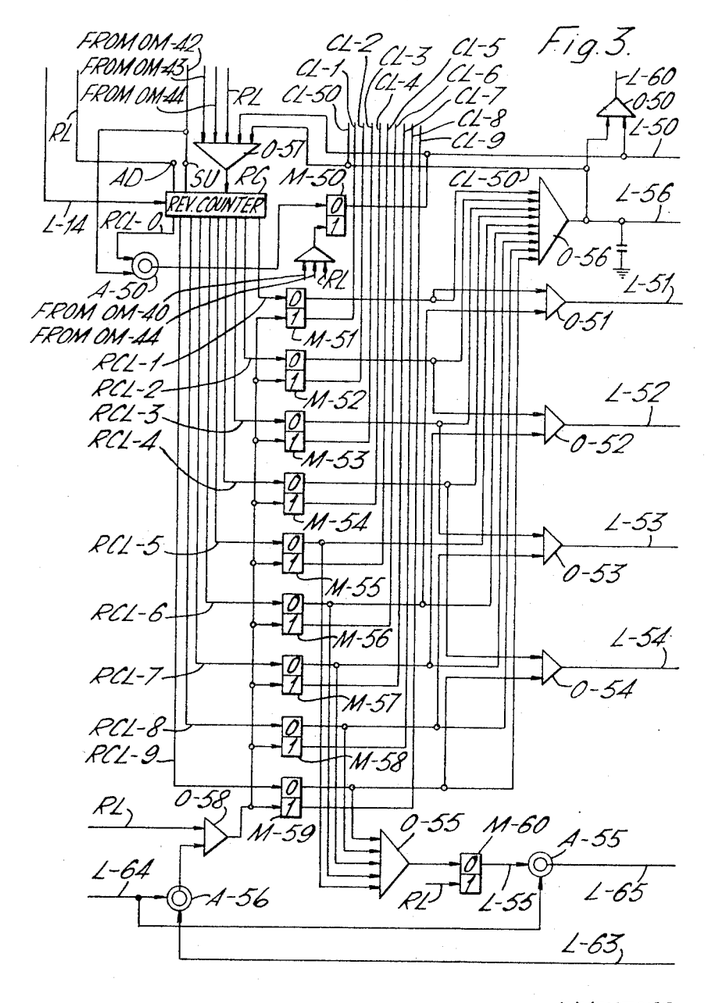

Mention has already been made that the same number of pulses as the price divided by ten of an article to be purchased appears on a line L-14 connected to the output of the NOT element N-13. As shown in FIG. 3, the line L-14 is connected to a reversible counter RC so designed as to be able to make summation and subtraction. The details of this counter will be described hereinafter. When a summation signal is applied through a line RL to a summation terminal AD of the counter, it counts the number of the pulses applied thereto through the line L-14. A subtraction signal given to the subtraction terminal SU reverses the operation of the counter, so that the counter subtracts the number of pulses from the total number of pulses previously counted. This counter is provided with a plurality, say, ten output lines RCL-0 through RCL-9. When the subtraction has resulted in zero, a signal appears on the line RCL-0. After that, if any more pulses are applied through the line L-14 to the counter, the number of pulses is counted to produce a signal on the corresponding output line.

When the push button PS-1 is pressed, four pulses are applied through the line L-14 to the counter RC and the number is counted and registered. The counter maintains the condition as it is until further change is introduced into it. If the purchaser wishes to buy an article of another kind, the push button corresponding to the kind of articles may be pressed. Then the corresponding number of pulses is applied to the counter and added to the previously registered number so that the result is registered and indicated on the indicator tubes. Now it is expected that the purchaser will introduce a coin or coins in accordance with the indicated price. As previously mentioned, the illustrated arrangement of the system is such that coins of three different denominations, that is, 10 cents, 50 cents and one dollar are to be used. Coins of different denominations may be introduced into the same or different coin inlets of the machine. With a single coin inlet, means may have to be provided for separating introduced coins according to their denominations. In the illustrated embodiment, three passages (not shown) for the three types of coins are provided each having a proximity switch for sensing coins passing by. In FIG. 2, SA-1, SA-2 and SA-3 denote such proximity switches for 10-cent coins, 50-cent coins and one-dollar coins. Three MEMORY elements M-30, M-31 and M-32 are provided corresponding to three proximity switches, respectively. When each of the proximity switches senses passing of a coin of the corresponding denomination, it produces a signal to be applied to the set terminal of the corresponding MEMORY element. Each of the MEMORY elements has two output terminals which will be referred to as the first and second output terminals, respectively. The first output terminal is the one which produces an output signal when a signal is applied to the set input terminal; and the second output terminal is the one which produces an output when a signal is applied to the reset terminal of the element. The first output terminal of the MEMORY element M-30 is connected to the AND element A-11; the first output terminal of the MEMORY element M-31 is connected to one input terminal of the OR element O-14; and the first output terminal of the MEMORY element M-32 is connected to one input terminal of the OR element O-15. Also, the first output terminals of the three MEMORY elements M-30, M-31 and M-32 are connected to the input of an OR element O-30. The output of this OR element is connected through a DELAY element D-10 to the input of the OR element O-11 on one hand and to line L-24 on the other hand. The second output terminals of the MEMORY elements M-30, M-31 and M-32 are connected to the input of an AND element A-30, the output of which is connected to one input terminal of an OR element O-31. The output of this OR element is connected to the reset terminal of a MEMORY element M-33, the set terminal of which is connected to the line L-12. The output terminal of the MEMORY element M-33 is connected to one input of an AND element A-31 whose other input is connected to the output of the NOT element N-12. The output terminal of the AND element A-31 is connected to one input terminal of an OR element O-32, the output terminal of which is connected to the reset terminal of each of the MEMORY elements M-30, M-31 and M-32.

Suppose that the purchaser has pushed the 40-cent push button PS-1 and introduced four 10-cent coins. It should be recalled that upon pressing of the push button, the reversible counter has counted and registered four pulses and the tubes AV-10 and AV-0 indicate the result as "40." Then, introduction of four 10-cent coins will cause the proximity switch SA-1 to produce at its output four pulses. Each of the four pulses is used as a signal for the MEMORY element M-30 to cause the element to produce a signal at the first output terminal. This output signal is applied to the AND element A–11 on one hand and to the OR element O–30 on the other. As a result, the OR element produces a signal to be applied through the DELAY element D–10 to the input of the OR element O–11. It will be easily understood that when the signal through the DELAY element is applied to the OR element O–11, the NOT element N–13 produces a pulse, which appears on the line L–14 on one hand and is applied through the line L–11 to the counter C–10 on the other. When the pulse is counted, the AND element A–11 produces an output, which is applied to this OR element O–16. The output of the OR element results in resetting of the counter C–10 and prevention of any more pulses from being produced from the NOT element N–13, as will be understood from the previous explanation.

On the other hand, the output of the OR element O–16 is applied also to the set terminal of the MEMORY element M–33, whereupon this element produces an output to be applied to the input terminal of the AND element A–31. A moment thereafter, the NOT element N–12 applies a signal to the other input terminal of the AND element A–31. Then, the AND element A–31 produces an output, which is applied through the OR element O–32 to the reset terminal of the MEMORY element M–30 to reset this element. At this time, that is when the element has been reset, the second output terminal of this element produces an output to be applied to one of the three input terminals of the AND element A–30. This AND element then produces an output since the other input terminals thereof are energized because the other two proximity switches SA–2 and SA–3 are inoperative. This output of the AND element A–30 is applied through the OR element O–31 to the MEMORY element M–33 to reset this latter element for the next operation.

When the purchaser drops a second 10-cent coin, the same operation will be repeated with the same result as just mentioned above. In this manner, four pulses appear on the line L–14.

Suppose that the purchaser has dropped a 50-cent coin instead of four 10-cent coins. Then the proximity switch SA–2 senses it and produces an output pulse to set the MEMORY M–31. Then the element produces at the first output terminal a signal, which is applied to the OR element O–14 on one hand and through the OR element O–30 and DELAY element D–10 to the OR element O–11 on the other hand. As a result, the NOT element N–13 produces pulses, which appear on the line L–14 on one hand and are applied to the counter C–10 on the other to be counted. When five pulses have been counted, the AND element A–13 produces an output, which is applied through the OR element O–16 to the line L–12, with the result that no more than five pulses appear on the line L–14.

In a similar manner, when one 1-dollar coin is introduced, 10 pulses will appear on the line L–14; and when coins of different denominations are introduced, the number of pulses corresponding to the total denomination will appear on the line L–14.

When any of the push buttons, say PS–1, is pressed, a signal appears on the line L–15. This output is applied to the inhibit terminal of the INHIBIT element INH–31 (see FIG. 2). This element has its input terminal connected to the NOT element N–12 and its output terminal connected through a line L–25 to the OR element O1–1 and each of the other OR elements O2–1, etc. belonging to the other push buttons (see FIG. 1).

When the push button PS–1 is pressed, the MEMORY elements M1–1 and M1–2 are set so that both the input and inhibit terminals of an INHIBIT element INH–40 are energized. Consequently no output is produced from the element. On the other hand, when the counter C–10 has finished counting four pulses, the output of the NOT element N–12 is applied to the INHIBIT element INH–31. At this time, if the push button PS–1 has already been released, the INHIBIT element INH–31 has its inhibit terminal deenergized and, consequently, produces an output to be applied through the line L–25 and the OR element O1–1 to the MEMORY element M1–1 to reset it. This removes the inhibit input to the INHIBIT element INH–40 and causes the element to produce an output and maintain it. This continuous output is applied through the OR element O1–1 to the reset terminal of the MEMORY element M1–1. Therefore, under this condition, even when the push button PS–1 is pressed again, the MEMORY element will not operate again until the MEMORY element M1–2 is reset.

When one of the push buttons has been pressed, if another one is pressed before the operation of the counter C–10 caused by the pressing of the previous push button has been completed, the counter cannot discriminate between the pulses produced by pressing the two push buttons. In order to prevent this, each of the MEMORY elements M1–1, M2–1, . . . has its reset terminal connected through its OR element O1–1, O2–1, . . . and a group of lines L–17 to the output terminals of all the other MEMORY elements. Suppose, then, that the push button PS–1 has been pressed. The output of its MEMORY element M1–1 is applied through the lines L–17 to the reset terminals of all the other corresponding MEMORY elements to keep them in reset condition. Under this condition, if any other push button is pressed, its MEMORY element cannot be set to operate.

However, when the number of pulses corresponding to the push button PS–1 that was first pressed has been counted, the MEMORY element M1–1 is reset as previously mentioned, so that its output that has been applied to the reset terminals of all the other MEMORY elements M2–1, . . . is removed, whereupon these elements become ready to operate.

Figure 7:
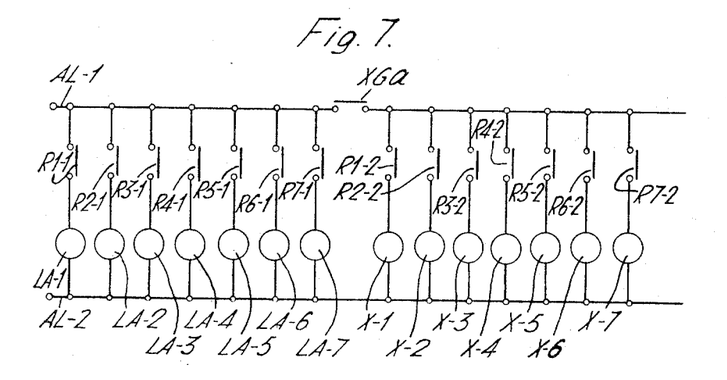
FIG. 7 shows the lamp circuit for indicating the article or articles selected by the purchaser and the circuit for actuating means for delivering an article or articles.
Figure 11:
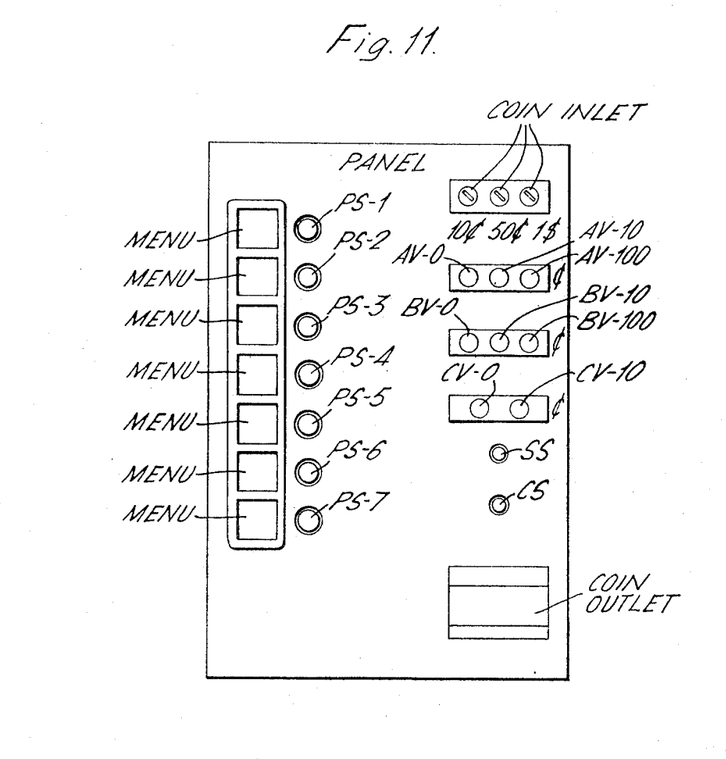
FIG. 11 is a front view of a vending machine embodying the invention.

When the push button PS–1 is pressed, the relay R1 is energized so that the contacts R1–1 and R1–2 are closed (see FIG. 7). The closure of the contact R1–1 turns on a lamp LA–1 serially connected to the contact between two alternating current lines AL–1, AL–2. The other push buttons may be pressed so that the corresponding lamps LA–2 through LA–7 are energized. These lamps are for the purpose of indicating the operation of the push buttons they correspond to and may conveniently be enclosed in the push buttons arranged on the front panel of the machine as shown in FIG. 11.

Figure 6:
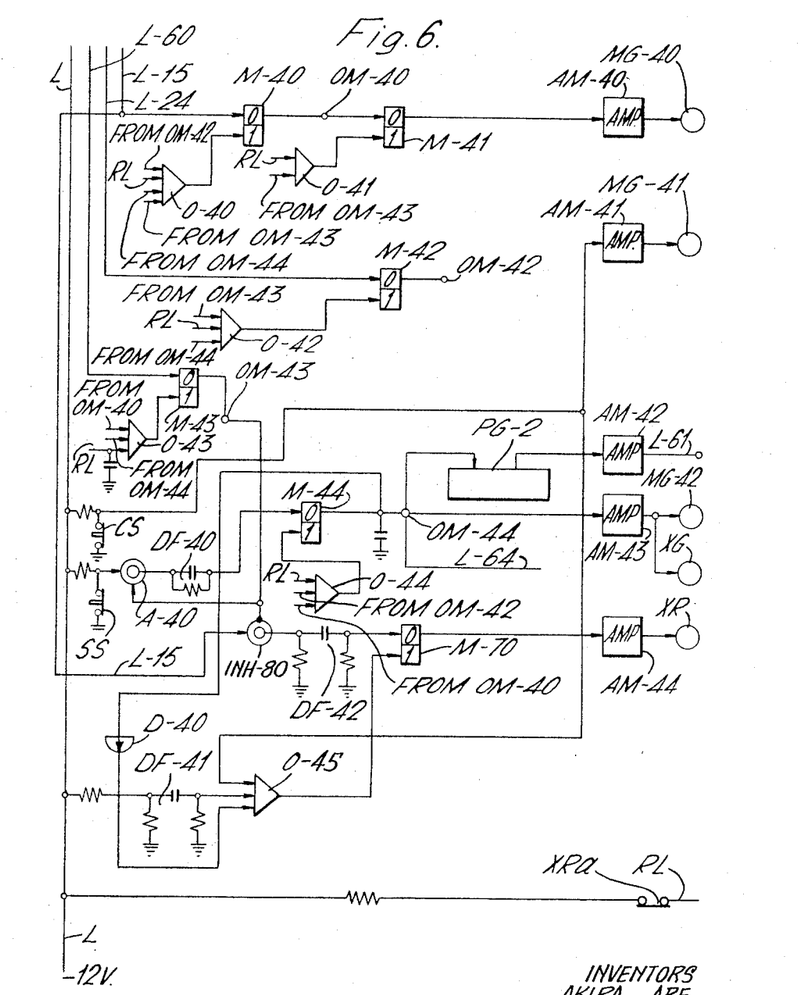

When the push button PS–1 is pressed, a signal appears on the line L–15, as previously mentioned. As shown in FIG. 6, this signal is applied to the set terminal of a MEMORY element M–40, whereupon a signal appears at the output terminal of this element and is applied to the set terminal of a MEMORY element M–41. The signal produced at the output terminal of this MEMORY element M–41 is amplified by means of an amplifier AM–40 and energizes a magnet MG–40, which opens a gate PCG (FIG. 8) so that coins may be inserted into a coin passage PC. Even when the push button is released, the gate PCG is kept open so long as the output of the MEMORY element M–41 continues. Closing of the gate will be described later.

Mention has already been made that when the purchaser has deposited one coin, a signal appears on the line L–24 (see FIG. 2). This signal is applied to the set terminal of a MEMORY element M–42, which produces a signal at its output terminal OM–42. This output signal is applied to one of the input terminals of an AND element A–21 in FIG. 5, to the other input terminal of which is applied a number of pulses corresponding to the denomination of the introduced coin through the line L–14, as previously mentioned. Consequently, the AND element A–21 produces the number of pulses.

It may be added that the output signal of the terminal OM–42 is also applied through an OR element O–40 to the reset terminal of the MEMORY element M–40 (FIG. 6). This results in removal of the one input of the AND element A–20, FIG. 5, so that the pulses being applied through the line L–14 to AND element A–21 are not applied through the AND element A–20 to the counters AC–10 and AC–100.

In order to indicate the total denomination of the coins introduced, three indicator tubes BV–0, BV–10 and BV–100 are provided. The arrangement and operation of these tubes are the same as the tubes AV–0, AV–10 and AV–100, with the elements BA–10, BA–100, BC–10 and BC–100 corresponding to AA–10, AA–100, AC–10 and AC–100, respectively.

The pulses appearing on the line L–14 caused by the indroduction of coins are applied to the reversible counter RC (FIG. 3). As previously mentioned, the counter is of such construction that when the counter is set ready for summation, it counts, sums and registers the number of pulses supplied through the line L–14 by pressing of a push button PS–1, etc.; while when a signal has been applied to the terminal SU, the counter starts subtracting from the number of price pulses previously counted and registered, the number of coin-value pulses supplied through the same line L–14 by introduction of coins.

Figure 4:
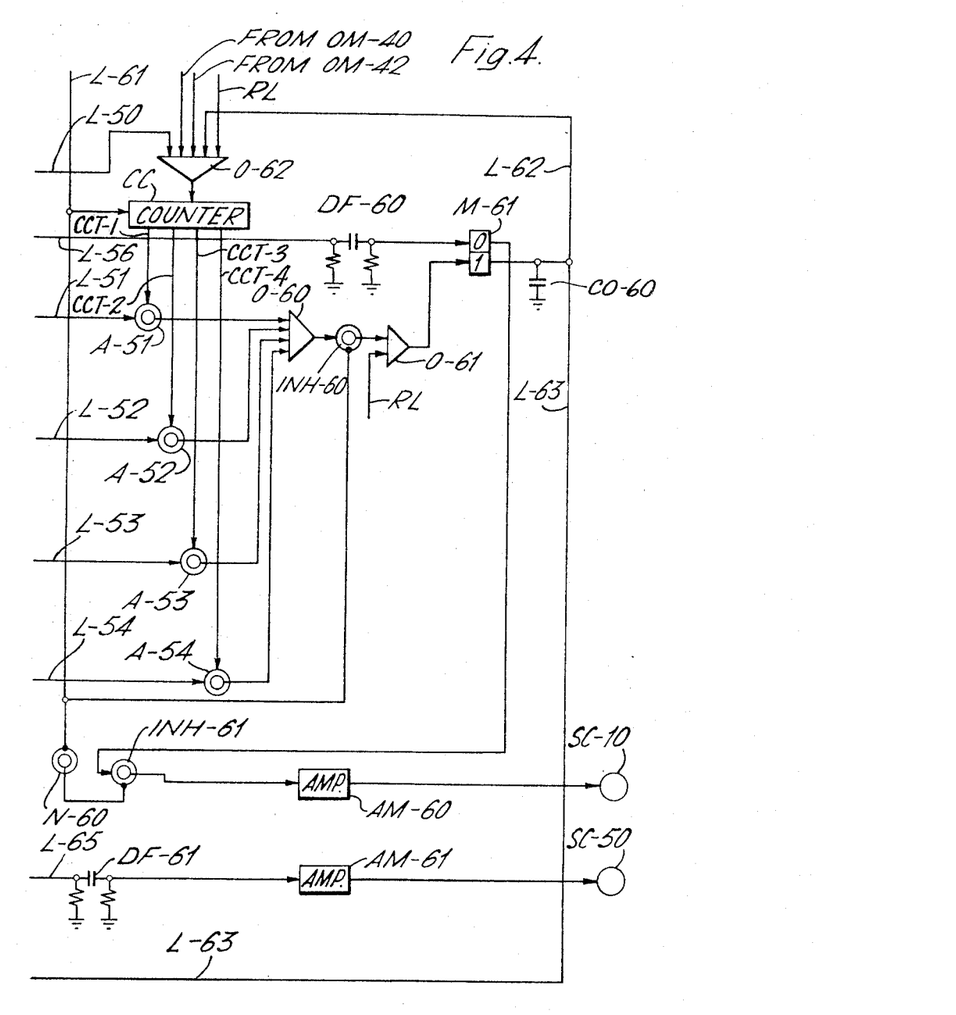

Suppose that the total price of the articles to be purchased is 110 cents. The counter registers eleven price pulses. If two 50-cent coins have been introduced, 10 coin value pulses are supplied to the counter, so that the counter now has one pulse left as registered. Then, if one more 50-cent coin is added, five pulses are applied, and subtracted from the one pulse still memorized, so that a change-due signal will appear on the output line RCL–4 of the counter. It will be seen that in accordance with the result of the subtraction, a signal appears on the corresponding one of the output lines RCL–0 through RCL–9. The line RCL–0 is connected to one input terminal of an AND element A–50, the other input terminal of which is connected to the output terminal OM–42 of the MEMORY element M–42 (FIG. 6). The output of the AND element A–50 is connected to the set terminal of a MEMORY element M–50, the output terminal of which is connected to an OR element O–50. The other lines RCL–1 through RCL–9 are connected to the set terminals of MEMORY elements M–51 through M–59, respectively. The first output terminals of the MEMORY elements M–51 through M–54 are connected to OR elements O–51 through O–54, respectively. These OR elements have output lines L–51 through L–54, respectively. These lines L–51 through L–54 are connected to one input terminal of AND elements A–51 through A–54, respectively (FIG. 4). The other input terminals of the AND elements are coupled to the output lines CCT–1 through CCT–4 of a counter CC, respectively. The first output terminals of the MEMORY elements M–55 through M–59 are connected to an OR element O–55, the output of which is connected to the set terminal of a MEMORY element M–60. The output terminal of this MEMORY element is in turn connected through a line L–55 to one input terminal of an AND element A–55. The first output terminals of the MEMORY element M–56 through M–59 are connected to the other input terminals of the OR elements O–51 through O–54, respectively. The first output terminals of all the MEMORY elements M–51 through M–59 are connected to the input of an OR element O–56. Thus, if any one of these nine MEMORY elements is set, an output appears on the line L–56 through the OR element O–56.

The second output terminals of the MEMORY elements M–51 through M–59 are connected to lines CL–1 through CL–9, respectively. These lines are used for indication of change, as will be described later.

Suppose that the counter RC memorizes the number of, say five price pulses that was previously supplied thereto by pressing of the push button PS–2. If two 10-cent coins were first introduced and then a 50-cent coin has been introduced, seven coin value pulses will be supplied to the counter to be subtracted from the five price pulses memorized. When the fifth of the seven coin value pulses has been applied, the subtraction will result in zero, whereupon a signal appears on the line RCL–0. When the sixth has come in, the signal on the line RCL–0 disappears and instead a signal appears on the line RCL–1. When the seventh and last one has come in, the sixth one disappears and a signal appears on the line RCL–2. Since there are no more pulses coming in, the signal on the line RCL–2 will last long enough to set the MEMORY element M–52. The period of time during which the signals on the lines RCL–0 and RCL–1 exist is too short to set the corresponding MEMORY elements M–50 and M–51. It may be added that the MEMORY elements M–50 through M–59 are less quick in response than all the other MEMORY elements used in the system.

When the total denomination of the coins introduced equals the total price of the articles, the MEMORY element M–50 is set and produces a signal on line L–50, which signal appears on a line L–60 through an OR element O–50. The signal is also applied through an OR element O–57 to the counter RC to reset it.

If 10-cent overpayment has been made, the MEMORY element M–51 is set so that a signal appears on the lines L–51 and L–56. If 60-cent overpayment has been made, the MEMORY element M–56 is set and a signal appears on the lines L–51, L–55 and L–56. Again, if 90-cent overpayment has been made, a signal appears on the lines L–54, L–55 and L–56.

The second output terminals of the MEMORY elements M–51 through M–59 are connected through the lines CL–1 through CL–9 to the input terminals CAT–1 through CAT–9 (FIG. 5) of an amplifier CA–10, respectively, and the first output terminals of these MEMORY elements are connected through the OR element O–56 and the line CL–50 to the input terminal CAT–0 of the amplifier CA–10. Two indicator tubes CV–0 and CV–10 are provided for indicating any change to be returned. The tube CV–0 is so designed as to indicate zero at all times. The amplifier CA–10 includes NOT elements (not shown) corresponding to the input terminals CAT–0 through CAT–9, respectively. Therefore, until any one of the MEMORY elements M–51 through M–59 is set, no signal is applied through the OR element O–56 and the line CL–50 to the input terminal CAT–0 of the amplifier CA–10, so that the tube CV–10 indicates zero. However, when one of the MEMORY elements, say M–56, is set, a signal is applied through the OR element O–56 and line CL–50 to the input terminal CAT–0 of the amplifier CA–10 to put out the zero indication on the tube CV–10, and at the same time the signal on the line CL–6 coming from the second output terminal of the MEMORY element M–56 to the input terminal CAT–6 disappears so that the tube CV–10 indicates "6." With the other tube CV–0 indicating "0," the amount of change to be returned is thus indicated as "60 cents."

Now that the amount of change to be given to the purchaser is indicated, the operation of giving it to the purchaser will now be explained. Suppose a signal appears on the line L–53. This signal is applied to one input terminal of an AND element A–53 (FIG. 4). At the same time a signal appears on the line L–56 to be applied to a MEMORY element M–61, whereupon the first output terminal of this element produces an output to be applied to an INHIBIT element INH–61. Now the circuit is set ready to return three 10-cent coins. Then, when a push button SS (FIG. 6) is pressed, a signal is applied to one input terminal of an AND element A–40, the other input terminal of which has already been energized as will be understood from the previous description. Then, this element produces a signal, which will be applied through a differential circuit DF–40 to a MEMORY element M–44 to produce a signal at its output terminal OM–44. This signal actuates a pulse generator PG–2 to produce pulses, which are applied through an amplifier AM–42 and a line L–61 to a counter CC. These pulses are also applied through line L-61 (FIG. 4) to a NOT element N-60. When the first pulse has been applied to the NOT element N-60, the INHIBIT element INH-61 is relieved of its inhibit signal and produces a pulse, which is amplified by an amplifier AM-60 and applied to a magnet SC-10. This magnet is designed to actuate a mechanism (not shown) to deliver one 10-cent coin every time the magnet is energized. When a second pulse is applied to the NOT element N-60, another 10-cent coin is given. When a third pulse is applied, a third 10-cent coin is pushed out. At this time, the counter CC has counted the three pulses and produces a signal to be applied to the AND element A-53, whereupon an output signal is produced therefrom to be applied through the OR element O-60 to the INHIBIT element INH-60. When the third pulse, which has also been applied to the inhibit terminal of the INHIBIT element INH-60, disappears, the INHIBIT element produces a signal to reset the MEMORY element M-61. A differential circuit DF-60 is connected to the set terminal of the MEMORY element M-61 in order to enable resetting of this MEMORY element by preventing the set signal from being continuously applied to the set terminal of the MEMORY element M-61 once the set signal has set the MEMORY element. When the MEMORY element M-61 is reset, there is no output therefrom to be applied to the INHIBIT element INH-61. Consequently, if a fourth pulse is applied to the NOT element N-60 and the inhibit terminal of the INHIBIT element INH-61 deenergized, no signal is produced therefrom to energize the magnet SC-10.

When the MEMORY element M-61 is reset, a signal is produced from the second output terminal, a little delayed by means of a condenser CO-60 and applied through a line L-62 to the input of an OR element O-62, the output of which restores the counter CC to its original condition. At the same time the delayed output of the second output terminal of the MEMORY element M-61 is also applied through a line L-63 to one of the input terminals of an AND element A-56. The other input terminal of the AND element A-56 (FIG. 3) is connected through a line L-64 to the output terminal OM-44 (FIG. 6), at which a signal appears upon pressing of the push button SS as previously mentioned. Consequently, a signal from the AND element A-56 is applied through an OR element O-58 to the reset terminal of the MEMORY elements M-51 through 59 (FIG. 3) to reset that one of them that was previously set, in this case, the MEMORY element M-53.

When a 90 cents overpayment is made and 90 cents in change is to be given, a signal appears on the lines L-54, L-55 and L-56, as previously mentioned. Then, the push button SS is pressed, whereupon a signal appears at the output terminal OM-44 (FIG. 6) and is applied through the line L-64 to the AND element A-55 (FIG. 3), the output of which is applied through a line L-65, a differential circuit DF-61 (FIG. 4) and amplifier AM-61 to a magnet SC-50 for actuating a mechanism (not shown) for pushing out a 50-cent coin. The signal applied to the magnet is one pulse through the differential circuit.

The signal appearing on the line L-54 (FIG. 3) is applied to the one input terminal of the AND element A-54 (FIG. 4), to the outer input terminal of which is applied a signal when the counter CC has counted four pulses. It will be understood from the foregoing description that four 10-cent coins are pushed out to the hand of the purchaser. Thus the 90-cent change has been given to the purchaser.

The pressing of the push button SS also results in delivery of the article or articles that have been purchased to the hand of the purchaser. The operation will be performed as follows: The output of the MEMORY element M-44 (FIG. 6) is applied through an amplifier AM-43 to a relay XG to energize it. This closes the contact XGa (FIG. 7) of the relay. As previously mentioned, the pressing of one or more of the push buttons PS-1, etc., has already closed one or more of the contacts R1-1 through R7-1 and also one or more of the contacts R1-2 through R7-2. Therefore, the closure of the contact XGa energizes the corresponding one or more of the magnets X-1 through X-7 serially connected to the contacts R1-2 through R7-2, respectively. These magnets are associated with delivery mechanism for sending out different kinds of articles for sale. It will be seen that upon energization of any one or more of these magnets, the corresponding delivery mechanisms will send out an article of the kind or kinds respectively.

Figure 9:
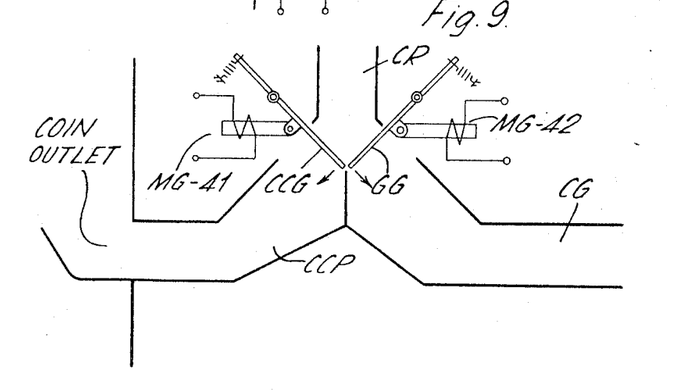
FIG. 9 is a sectional view of the gate means for accepting or returning the coins introduced.

The output of the amplifier AM-43 also energizes a magnet MG-42 shown in FIG. 9 so that a gate GG is opened to drop the coins stored in the end of a passage CR into an acceptance passage CG.

When the push button SS is pressed, the output of the MEMORY element M-44 is applied through a DELAY element D-40 to an OR element O-45, the output of which is applied to the reset terminal of a MEMORY element M-70, whereupon the signal that has been applied through an amplifier AM-44 to a relay XR disappears. Upon deenergization of the relay XR, a contact XRa is closed to connect a reset line RL to a source line L. Then, a signal appearing on the line RL resets all the MEMORY elements and counters to which the line RL is connected directly or through an OR element. The DELAY element D-40 is inserted for delaying the reset signal on the line RL until the counter CC of FIG. 4 has finished its operation duty.

If the purchaser wishes to refrain from purchaser after introducing a coin or coins, the push button CS may be pressed. This causes a signal to be applied through an amplifier AM-41 to a magnet MG-41 to energize it and open the gate CCG to drop the coin or coins stored in the end of the passage CR into a return passage CCP (FIG. 9).

Figure 8:
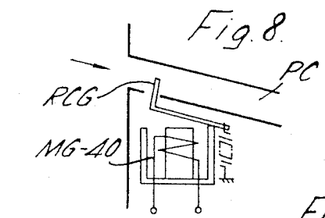
FIG. 8 is a sectional view of the coin inlet.

When a signal is produced out of the OR element O-50 (FIG. 3), the MEMORY element M-43 (FIG. 6) is set to produce an output. This output signal is applied through an OR element O-41 to the MEMORY element M-41 to reset it. As a result the magnet MG-40 is deenergized to close the gate RCG (FIG. 8). After that, no more coins can be introduced.

In the foregoing description the push button SS is pressed. However, if the output terminal OM-43 of the MEMORY element M-43 is connected through the differential circuit DF-40 to the set terminal of the MEMORY element M-44, the push button SS may be unnecessary.

Thus, one cycle of the operation of the system has been completed. When any push button PS-1, etc. is pressed for a next cycle of operation, a signal will appear on the line L-15. This signal will be applied to an INHIBIT element INH-80 (FIG. 6). Since the inhibit terminal of this element is deenergized, the output of this element will be applied through the amplifier AM-44 to the magnet XR to energize it. This will open the contact XRa to remove the reset signal on the line RL so that the system is now operating.

The operation of the reversible counter RC employed in the control system was described with reference to FIG. 3. The arrangement of the counter will now be described in further detail with reference to FIG. 10. The counter comprises seven binary counters BC-1 through BC-7, each consisting of a well known flip-flop composed of, for example transistors, with its two inputs connected to a differential circuit.

Figure 10:
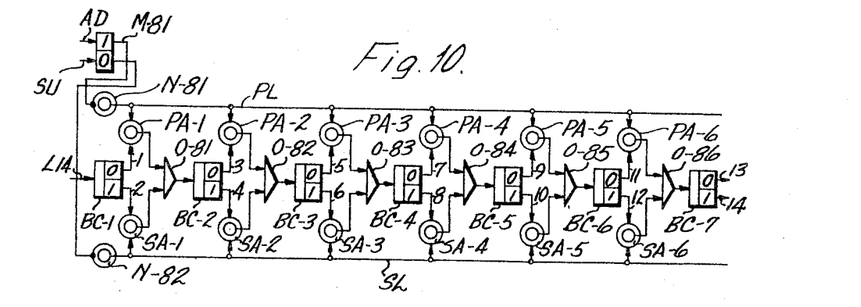
FIG. 10 is a schematic diagram of the reversible pulse counter.
Figure 10A:
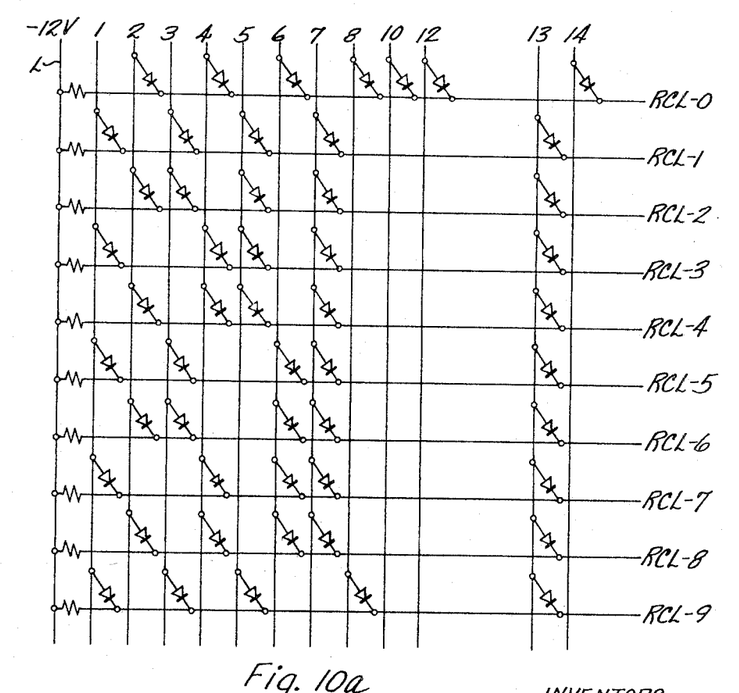
FIG. 10a is a circuit diagram of a diode matrix having input connections to the pulse counter at FIG. 10.

The first output terminal of each of the binary counters BC-1 through BC-7 is connected to one input terminal of each of AND elements PA-1 through PA-6. The other input terminal of each of these AND elements is connected to a line PL. The output terminal of each of the AND elements is connected through each of OR elements O-81 through O-86 to the next binary counter. The second output terminal of each of the binary counters BC-1 through BC-6 is connected to one input terminal of each of AND elements SA-1 through SA-6. The other input terminal of each of these AND elements is connected to another line SL. The output terminal of each of the AND elements is connected through each of the OR elements O-81 through O-86 to the next binary counter.

In addition, there is provided a MEMORY element M-81 having its reset terminal and set terminal connected to the terminal AD and the terminal SL (FIG. 3), respectively. The second output terminal of the MEMORY element M-81 is connected through a NOT element N-81 to the line PL while the first output terminal thereof is connected through NOT element N-82 to the line SL.

For simplicity of explanation, the output terminals of the binary counters BC-1 through BC-7 are shown indicated by the numerals "1" through "14." While the push button PS-1 is not pressed, no signal appears on the line PL but a signal appears on the line SL, because the second output terminal of the MEMORY element M-81 produces an output but the first output terminal thereof produces no output. And with the binary counter BC-1 being in reset state, each of the other binary counters BC-2 through BC-7 produces an output at its second output terminal.

It is well known that in a pulse counter comprising a number of binary counters, every time a pulse signal is applied to each of the binary counters, an output alternates at the two output terminals, and that with seven binary counters employed, 128 pulses can be registered.

When any push button PS-1, etc. has been pushed, the corresponding number of pulses are coming through the line L-14 into the first binary counter BC-1. The first pulses causes this counter to eliminate the output at the second output terminal No. 2 and at the same time produce an output at the first output terminal No. 1. The second pulse causes the counter to eliminate the output at the first output terminal No. 1 and again produce an output at the second output terminal No. 2. This output is applied to one input terminal of the AND element SA-1. This AND element has its other input terminal being supplied with a signal through the line SL. Consequently, a signal is produced therefrom and is applied to the next binary counter BC-2, whereupon the signal at the second output terminal No. 4 of the binary counter BC-2 disappears and, instead, a signal appears at the first output terminal No. 3. In this manner, every time a pulse is applied, the output alternates at the two output terminals.

Suppose that four pulses have been applied to the reversible counter, and a signal appears at the terminal No. 5 of the binary counter BC-3, while no signal is at the terminal No. 6 thereof, and with all the other binary counters, a signal appears at the second output terminal Nos. 2, 4, 8, 10, 12 and 14. No signal will appear at the terminal No. 13 and, consequently, at the terminals RCL-0 through RCL-9 until 128 pulses are applied to the reversible counter.

With four pulses thus registered in the reversible counter, when a 50-cent coin has been introduced, a signal appears at the terminal SU as was previously mentioned. This signal sets the MEMORY element M-81, whereby a signal appears on the line PL. At the same time, through the line L-14 five pulses, are coming in, the first of which produces an output at the terminal No. 1 so that the AND element PA-1 produces an output. In this manner, when a fourth pulse has been applied, an output appears at all the second output terminals numbered 2, 4, 6, 8, 10, 12 and 14, whereupon a signal appears on the line RCL-0. When the fifth and last signal has been applied, a signal appears at the first output terminals numbered 1, 3, 5, 7, 9, 11 and 13 so that an output appears on the line RCL-1. If a one-dollar coin, instead of a 50-cent coin, has been introduced, an output appears at the terminals numbered 2, 3, 6, 7, 9, 11, and 13, so that an output appears on the line RCL-6.

Thus, with the MEMORY element M-81 being in a reset condition, when one of the push button PS-1, etc. is pressed, the counter counts and registers the number of price pulses corresponding to the pressed button coming in through the line L-14. Then, when a signal is applied through the terminal SU to the MEMORY element M-81 by introducing a coin into the machine, coin value pulses are coming in through the line L-14. When the number coin value pulses is the same as, or greater than, the number of price pulses previously registered, the counter produces an output on that one of the output lines which corresponds to the difference between the two numbers.

Figure 12:
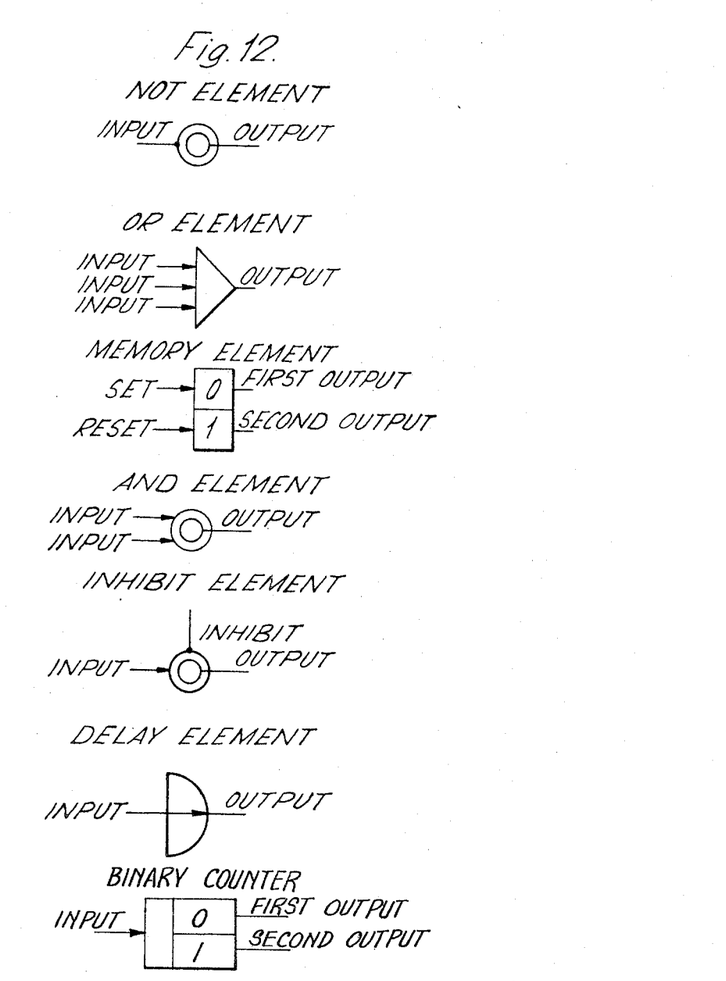
FIG. 12 is a key showing the various static element symbols.

A comment on FIG. 12: the NOT element has an input and an output terminal; the OR element has an output terminal and a plurality of input terminals; the MEMORY element has a zero section and a one section, the former having a set input and the first output terminal and the latter section has a reset input and the second output terminal; the AND element has an output terminal and a plurality of input terminals; the INHIBIT element has an input, an inhibit and an output terminal; the DELAY element has an input and an output; and the binary counter has an input terminal and the first and the second output terminal.

It should be recognized that the embodiment illustrated above is merely representative and that various modifications may be made without departing from the true scope and spirit of the invention as defined in the appended claims.

What we claim is:

1. An electronic control system for vending machines, comprising a reversible pulse counter having first and second control inputs and a plurality of outputs and having a separate pulse input for receiving different series of pulses representative of price of purchases selected and of value of coins deposited by a purchaser, means response to purchase selection for energizing said first control input and applying to said pulse input price pulses corresponding in number to the price of a purchase selected, means responsive to coin deposit for energizing said second control input and applying to said pulse input coin value pulses corresponding in number to the value of a coin deposited, said counter including means responsive to one of said control inputs to register applied pulses and means responsive to the other of said control input for deregistering applied pulses whereby the pulse total registered represents the difference between said numbers of applied pulses.

2. The electronic control system of claim 1 further including a plurality of storage elements individual responsive to the separate outputs of the reversible counter and having response times slower than the counting rate of said counter whereby to store only said pulse total.

3. The electronic control system of claim 1 wherein said reversible counter consists entirely of static electronic elements.

4. The electronic control system of claim 1 wherein said reversible pulse counter comprises a first series of AND elements each having one input connected to said first control input, a second series of AND elements each having one input connected to said second control input, a series of bistable elements having an input and set and reset outputs operable to be alternately energized by consecutive pulses applied to said input, the set outputs of successive bistable elements being connected to the other input of each of the first series and elements, the reset outputs of successive bistable elements being connected to the other input of each of the second AND elements, and OR elements interposed between adjacent bistable elements, said OR elements having two inputs, one responsive to an AND element in the first series and the other responsive to an AND element in the second series, said OR elements further having an output to which the next succeeding bistable element input is responsive, the first bistable element in said series being adapted to receive said applied pulses.

5. The electronic control system of claim 1 wherein the means for applying price pulses and coin value pulses include in common a second pulse counter and a first pulse generator operable to enter pulses in both said second pulse counter and in said reversible pulse counter, said system further including purchase selection means operable by a purchaser to energize to first control input of the reversible counter and having means responsive to the second pulse counter to limit supply of pulses to the reversible counter to a number corresponding to the price of the purchase selected, and coin deposit means operable by deposit of a coin to energize the second control input of said reversible counter and having means responsive to the second pulse counter to limit supply of pulses to the reversible counter to a number corresponding to the value of the coin deposited.

6. The electronic control system defined in claim 2 wherein said reversible counter includes means operable in response to application of price pulses to energize said outputs sequentially in one direction, means operable in response to application of coin-value pulses of energize said outputs sequentially in the opposite direction up to the number of coin-valve pulses equal to the number of price pulses applied, and means operable in response to application of coin-value pulses greater in number than said number of price pulses to energize said outputs sequentially in said one direction, said difference thereby representing the value of change due to the purchaser, and means in said system responsive to said storage elements for returning said value in change to the purchaser.

7. The electronic control system of claim 5 wherein said second pulse counter includes a plurality of output terminals, said selection means includes a plurality of individually operable selectors associated with different selectable purchases, and said coin deposit means includes a plurality of switch means individually operable by coins of different denominations, and wherein the means for limiting the number of price and coin value pulses supplied to the reversible counter include in common a plurality of AND elements each responsive to one of the second pulse counter outputs and to one of said selectors and one of said switch means, an OR circuit responsive to all of said AND elements and operable to detect coincidence of inputs thereto, and means responsive to said OR circuit and operable upon occurrence of such coincidence to interrupt supply of pulses to said reversible counter and to reset said second pulse counter.

8. The control system of claim 6 wherein said change return means comprises first and second coin return means for returning coins of first and second different denominations.

9. The control system of claim 6 wherein said change return means comprises a change pulse counter having a plurality of outputs of means for applying to said change pulse counter a number of pulses corresponding to said difference total, means responsive to successive application of change pulses to said change pulse counter to successively deliver coins to the purchaser, a plurality of AND elements each responsive to one of said change pulse counter outputs and one of said storage elements, an OR circuit responsive to said AND elements and operable to detect coincidence of the number of applied change pulses and said difference total, and means responsive to the OR circuit for terminating delivery of coins.

10. The control apparatus of claim 9 wherein said change return means includes means for returning coins of a second denomination of higher value than the first, comprising an OR circuit responsive to predetermined ones of said storage elements which are associated with reversible counter outputs corresponding to difference totals representing coin values equal to or greater than said second denomination, and means responsive to said last-mentioned OR circuit for delivering a second denomination coin.

11. The control apparatus of claim 1 further including means responsive to said application of price pulses for indicating the price of selected purchases, means responsive to application of coin value pulses for indicating the value of coins deposited, and means responsive to said registered pulse total for indicating said difference, each of said indicating means including a digital pulse counter and a digital indicator tube responsive thereto and adapted to render numerical indications corresponding to the digital value registered in the associated counter.

References Cited by the Examiner

UNITED STATES PATENTS

| | | | |
|---|---|---|---|
| 2,649,947 | 8/1953 | Nelsen | 194—10 |
| 2,663,398 | 12/1953 | Skillman | 194—10 |
| 2,800,988 | 7/1957 | Timms | 194—9 |
| 2,850,133 | 9/1958 | Greenly | 194—10 |
| 2,914,159 | 11/1959 | Burns | 194—1 |
| 3,023,874 | 3/1962 | Zindel | 194—10 |

ROBERT B. REEVES, *Primary Examiner.*

SAMUEL F. COLEMAN, LOUIS J. DEMBO,
*Examiners.*

S. TOLLBERG, *Assistant Examiner.*